United States Patent
Hao et al.

(10) Patent No.: US 11,294,601 B2
(45) Date of Patent: Apr. 5, 2022

(54) METHOD OF DISTRIBUTED DATA REDUNDANCY STORAGE USING CONSISTENT HASHING

(71) Applicant: HERE DATA TECHNOLOGY, Guangdong (CN)

(72) Inventors: Bin Hao, Guangdong (CN); Jian Zhu, Guangdong (CN); Jingyao Zhang, Guangdong (CN)

(73) Assignee: HERE DATA TECHNOLOGY, Shenzhen (CN)

( * ) Notice: Subject to any disclaimer, the term of this patent is extended or adjusted under 35 U.S.C. 154(b) by 0 days.

(21) Appl. No.: 17/059,438

(22) PCT Filed: Jul. 10, 2018

(86) PCT No.: PCT/CN2018/095082
§ 371 (c)(1),
(2) Date: Nov. 29, 2020

(87) PCT Pub. No.: WO2020/010502
PCT Pub. Date: Jan. 16, 2020

(65) Prior Publication Data
US 2021/0216245 A1  Jul. 15, 2021

(51) Int. Cl.
*G06F 3/06* (2006.01)

(52) U.S. Cl.
CPC ............ *G06F 3/0659* (2013.01); *G06F 3/067* (2013.01); *G06F 3/0614* (2013.01); *G06F 3/0629* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 9,665,284 B2* | 5/2017 | Zhang | G06F 12/0223 |
| 2004/0083289 A1* | 4/2004 | Karger | H04L 67/10 709/226 |
| 2012/0159102 A1* | 6/2012 | Kan | G06F 3/0625 711/162 |
| 2020/0364150 A1* | 11/2020 | Breslow | G06F 12/1018 |

* cited by examiner

Primary Examiner — Brian R Peugh

(57) ABSTRACT

Disclosed is a method of distributed data redundancy storage using consistent hashing, which is used for selection of pre-stored data in the distributed position in storage cluster. The method is implemented by establishing a logical topology for each storage node in a distributed storage system, determining the position of each node in a storage node sequence corresponding to each hash subspace by using consistent hashing, and then determining a number of data copies and each piece of stored data according to the redundant storage policy of pre-stored data; and storing each piece of stored data in a different storage node according to storage rules.

9 Claims, 5 Drawing Sheets

METHOD OF DISTRIBUTED DATA REDUNDANCY STORAGE USING CONSISTENT HASHING

TECHNICAL FIELD

The present disclosure relates to distributed storage, and in particular, to methods of distributed data redundancy storage using consistent hashing.

BACKGROUND

It is now in a new era that cloud computing with key technologies of explosive increase in data scale and safety and efficiency in massive data storage is popularized and widely applied. Traditional storage technologies including NFS, SAN have been unable or difficult to meet the storage requirements of mass data (in PB or EB level) in terms of scalability, fault tolerance, availability and deployment costs.

SUMMARY

Disclosed in the present disclosure is a method of distributed data redundancy storage using consistent hashing, which solves the problem that traditional storage technologies in the Background cannot or hard to meet the requirements for mass data storage.

According to a first aspect, there is provided a method of distributed data redundancy storage using consistent hashing. The method may comprise:

a node creating step: establishing a logical topology for each storage node in a distributed storage system, and determining the position of each node in a storage node sequence corresponding to each hash subspace by using consistent hashing;

a data writing step: determining a number of data copies and each piece of stored data according to the redundant storage policy of pre-stored data; and storing each piece of stored data in a different storage node according to storage rules.

According to the method of distributed data redundancy storage using consistent hashing in embodiments of the present disclosure, since storage data is stored to different nodes and the object identity is mapped to hash subspace(s) by computing hash only once and storage node list corresponding to the hash subspace is selected by means of a random selection algorithm with monitored weight, the efficiency of node selection is improved, further meeting the requirements for mass data storage.

DETAILED DESCRIPTION

Figure 1:
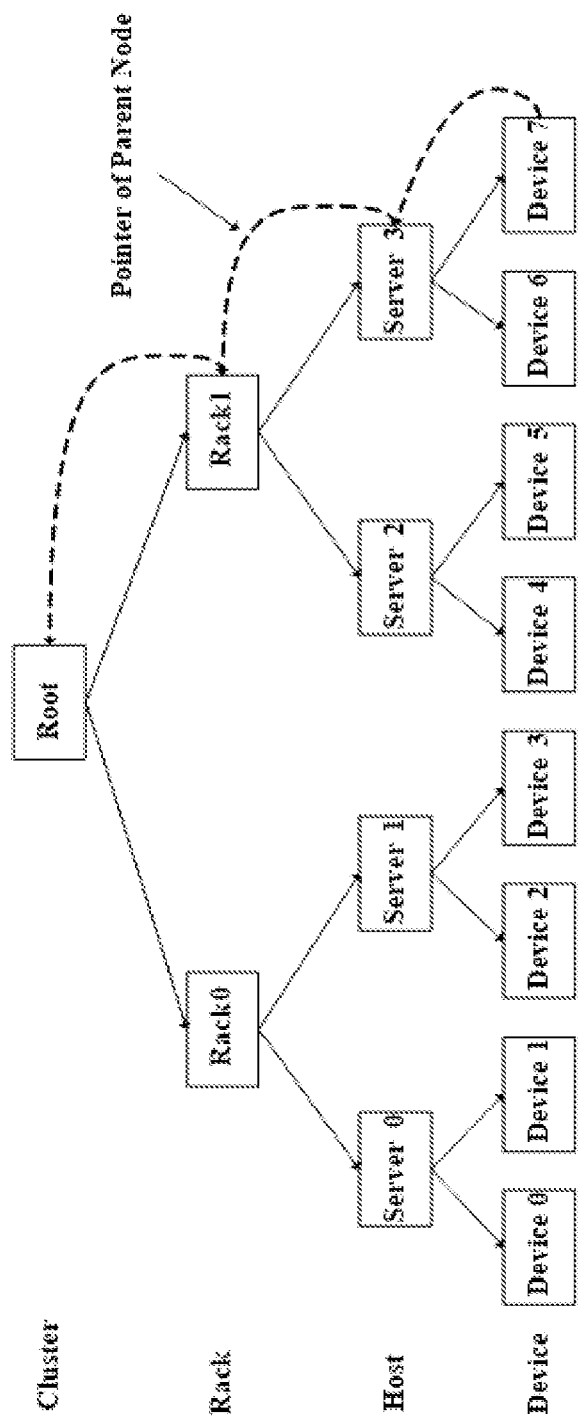
FIG. 1 is a schematic diagram of a hierarchical architecture of cluster(s) constructed based on physical storage devices.

The present disclosure will be further described in detail below through specific embodiments in combination with the accompanying drawings. Common or similar elements are referenced with like or identical reference numerals in different embodiments. Many details described in the following embodiments are for the purpose of better understanding the present disclosure. However, a person skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For the person skilled in the art, such operations are not necessary to be explained in detail, and they can fully understand the related operations according to the description in the specification and the general technical knowledge in the field.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connected" and "coupled" here include direct and indirect connections (coupling) unless otherwise specified.

For the problems raised in the aforesaid background, an object storage system, a distributed storage system with high scalability, reliability and availability as well as low cost, has been adopted and gradually become a good choice for mass data storage. In the object storage system, a data entity is served as a single object with a unique identity (or a big data entity is split into multiple objects), and the object identity is mapped into multiple object storage devices (hereinafter referred to as OSD device) in different Failure Domains in a cluster, wherein the object is redundantly stored in multiple copies or erasure codes/reproduction codes, thereby achieving high reliability and high availability. CEPH as an object storage system (also supporting file-level storage and block storage) devised CRUSH algorithm to implement storage load balance. CRUSH adopts the idea of consistent hashing (a Distributed Hashing Table), including firstly dividing a hash space (or hash ring) into multiple virtual subspace (called Placement Group, PG, in CEPH), mapping an object identity onto a subspace PG on the hash ring using hash function, then mapping PG to an OSD list in a structured cluster that meets certain storage rules. Though the CRUSH algorithm has the advantages of high scalability and pseudo-random equilibrium distribution, it has its limits in that: (1) there is only inclusive relation between a superior node and a subordinate node (in sequence) when building a hierarchical topology of cluster nodes, so it is necessary to go through the entire cluster for each layer (i.e. a complete traverse from a leaf node to the root node) to find parent node of a child node in case of adjusting the leaf node i.e. parameters including storage capacity (weight) of the OSD device; accordingly, the time complexity of such algorithm is n log(n), resulting in low efficiency when the cluster size is large; (2) there is no restriction on the selection of a child node at a selected point during node selection; in fact, the node is selected pseudo-randomly using hash value, and is determined whether it is valid after the selection is completed. If the candidate node is in conflict with the selected node or becomes failure, it is need to re-select, leading to repeated selection and slow convergence of the selecting process; (3) it involves a plurality of computation for hash values during selection of multiple layers from the initial selection point to the leaf node in the bottom of the tree; for example, when the node type is CRUSH_BUCKET_STRAW, the hash values will be computed on each child node at each layer; thereby reducing the selection to a certain extent effectiveness.

On the basis of the contents discussed above, there is provided a method of distributed data redundancy storage using consistent hashing in embodiments of the present disclosure. The method adopts a random selection algorithm with monitored weight, computing hash only once for mapping the object identity to hash subspace(s) during the selection of target storage node for pre-stored data from the cluster, improving the efficiency of node selection and then meeting the requirements for mass data storage.

Embodiment 1

A method of distributed data redundancy storage using consistent hashing proposed in the present disclosure may include following steps:

Step 1: Properties of devices and nodes are defined and a hierarchical architecture of cluster(s) is constructed, so that the entire node(s) selection can be implemented in the hierarchical architecture of the cluster with the following specific execution process:

1). The properties of devices and nodes are abstracted, where devices represent storage devices that actually join in the cluster, and nodes define based on the position of physical storage devices in the hierarchical architecture of the cluster. In FIG. 1 there is shown a schematic diagram of a hierarchical architecture of cluster(s) constructed based on physical storage devices. Storage device (Device, a special node different from ordinary node, is located in the lowest layer of the cluster architecture and is the final storage location of data) generally has a unique identity. The information of its position in the hierarchical architecture of cluster(s) may include its own server identity, rack identity, data center identity, etc. The properties associated with the storage device include storage capacity (weight) and so on. Weight may denote the relative storage capacity of corresponding device; for example, suppose that a weight of 1.0 represents a capacity of 1T, a device with a capacity of 15T has a weight of 15.0. Nodes are components of the hierarchical architecture of the cluster and are constructed in a hierarchical tree architecture, wherein the root node (Root) is in the top layer. The "Root" is null entity which is the denotation of the whole cluster and generally a starting point for node selection. Nodes (which is the ones in interior layers other than device layer) may include but not limit to hosts, racks, data centers, etc., and the properties thereof may include but not limit to node ID (NodeId), node type (NodeType), node weight (Weight), sequences of child nodes (ChildrenNodes), weight sequences of child nodes (ChildrenWeights), pointers of parent nodes (ParentNode, a device node also has a parent pointer). Node weight is equal to the sum of the weights of all its own child nodes, which means that the storage capacity of the node is equal to the sum of the storage capacities of all child nodes in below layers. The leaf node in the bottom-most layer, i.e. storage device, may have all the properties of all storage devices and may be the final selection object for the node selection algorithm. Suppose that there are three storage layers including device, server and rack in a small cluster, adding a virtual node "Root" at the top layer to represent the whole cluster, the value of NodeType therefore is:

{NODE_TYPE_DEVICE,
NODE_TYPE_SERVER,
NODE_TYPE_RACK,
NODE_TYPE_ROOT}, where each server may include more than one device whose logical representation is a mount point or directory. The device nodes in the bottom-most layer of the storage hierarchy are referred to as Device and nodes in other storage layers as Node in order to distinguish them from actual storage nodes.

2). All devices into the cluster are added/joined in turn. First, a root node that is the representative of the whole cluster is created; whether the node of each device exists is determined, here the node being the ancestor or parent node of corresponding device (starting from the top layer of its location, the device may be for example a data center or rack) to be added/joined. If no such node exists, this node is created, its parent node (the parent node of "Root" is null) established, this node is configured as a next insertion point until the immediate parent node of the device is created, and this immediate parent is set as the insertion point of the device to be added.

3). A device node is created and added to the insertion point which is set as the immediate parent node of the device.

4). A weight value (or other properties that may be used for selection) is assigned to the device, and the weights of all its parent nodes (ancestor nodes) are modified so that the total weight of the parent nodes is equal to the sum of the weights of all child nodes. From the foregoing, since the pointer of an immediate parent node is added to the properties of the node in the present disclosure, the time complexity for modifying weight(s) can be reduced from n log(n) to log(n), speeding up the adjustment of weight(s). The following will be explained by way of specific examples.

Figure 2:
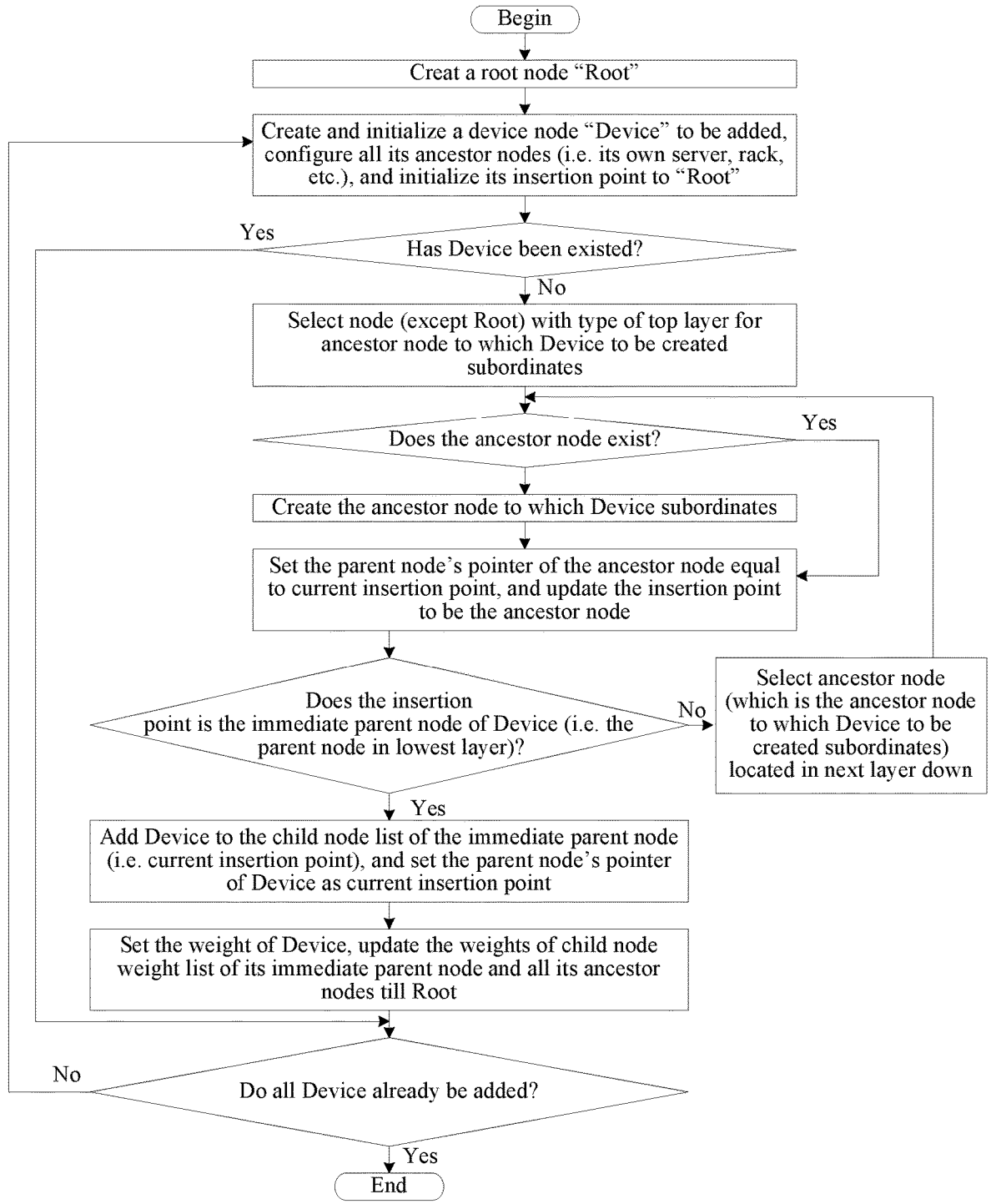
FIG. 2 is a flowchart of adding/joining node(s) based on the position(s) of physical storage device(s) in a hierarchical architecture of cluster(s)

In FIG. 2, there is shown a flowchart of defining nodes based on the position of a physical storage device in a hierarchical architecture of cluster(s). As illustrated, a root node "Root" is firstly created. The "Root" is null entity which is the denotation of the whole hierarchical architecture of cluster(s). Then, NodeId=0, NodeType=NODE_TYPE_ROOT, Weight=0, and child nodes and their weight sequences are defined as ChildrenNodes={ }, ChildrenWeights={ }

Because there are no child nodes at this time, the array is empty.

ParentNode=NULL ("Root" node is in the top layer of the storage hierarchy and has no parent nodes.)

Devices are then added one by one to the cluster, specifically, the ID of a device "DeviceId" is checked whether it has already existed, if so, the device is stopped adding and a next device is continued to be added. Starting from the highest storage hierarchy where the device (a rack "Rack" in this embodiment) is located, whether the node with ID "Device.RackId" has been existed is checked in the cluster, if not, a new node "RackNode" is created.

NodeId=Device.RackId,
NodeType=NODE_TYPE_RACK,
Weight=0,
ChildrenNodes={ },
ChildrenWeights={ },
ParentNode=Root (pointer of parent node), "RackNode" is added to the child node list "Root.ChildrenNodes" of its parent node "Root", its weight "Weight"

is added to "Root.ChildrenWeights", and "RackNode" is set as the insertion point of the next newly created node (i.e. its ParentNode).

Whether the node with ID "Device.ServerId" exists is checked in the cluster, if not, a new node "ServerNode" is created,
NodeId=Device.ServerId,
NodeType=NODE_TYPE_SERVER,
Weight=0,
ChildrenNodes={ },
ChildrenWeights={ },
ParentNode=RackNode (pointer of parent node),
ServerNode is added to the child node list of its parent node RackNode,
RackNode.ChildrenNodes,
Its weight "Weight" is added to Rack.ChildrenWeight,
ServerNode is set as the insertion point of a next newly created node.

After all the upper nodes of the device are created, the insertion point of the device in the cluster is obtained, ServerNode in this embodiment, and the new joined node is DeviceNode.
NodeId=Device.DeviceId,
NodeType=NODE_TYPE_DEVICE,
Weight=0 (it is changed to Device.Weight in next steps),
ChildrenWeights={ },
Its parent node's pointer is ParentNode=ServerNode,
DeviceNode is added to the child node list of its parent node ServerNode,
ServerNode.ChildrenNodes,
Its weight Weight is added to Server.ChildrenWeights;

After the device node is created, it is necessary to adjust the weight of its upper nodes and the weight list of child nodes, the weight of child nodes in the weight list of child nodes in upper layers is adjusted to the weight of child nodes in corresponding below layers, and the weight of nodes in current layer is equal to the sum of the weights of all its child nodes. In this embodiment, since a parent node's pointer is added to the node architecture, the adjustment of weights only needs to follow the path pointed by the parent node's pointer, modify the weight "Weight" of the parent node and add the weight "Weight" of the child node to its Children-Weights list, resulting in a time complexity thereof O(log (n)).

The cluster architecture is initially constructed after all devices are added. As shown in FIG. 1, the cluster has two racks each of which has two server. Every server has two devices.

Step 2: Storage rules are established according to the hierarchical architecture of cluster(s). On the basis of redundant storage policy of pre-stored data, the number of data copies and each piece of stored data are determined.

The storage rules are established according to the hierarchical architecture of cluster(s) for being used as supervision rules for subsequent randomly selecting weight. First, the total number of copies of pre-stored data is determined. Then, the maximum number of copies allowed for each storage hierarchy is determined. And finally, a mapping table between node types and maximum number of stored replicas is established, wherein the storage hierarchy is set to correspond to the node types, and the mapping table may include a correspondence between the maximum number of replicas allowed to be stored for the object and the maximum number of times that the node of the corresponding node type is allowed to be selected. The specific execution process may be as follows.

1). The total number of pre-stored data copies N is determined, which is related to data redundant policy adopted by the storage cluster, when adopting multiple repetitions for redundant storage policy. The value N is a preset total number of copies of pre-stored data, each piece of stored data is pre-stored data or a copy thereof. When adopting erasure coding (N,K) for redundant storage policy, pre-stored data is divided into K data blocks and encoded into N coded blocks, where N is the total number of coded blocks of the pre-stored data. The number of data copies is the total number of coded blocks, and each piece of stored data corresponds to one coded block.

2). The maximum number of copies allowed for each storage hierarchy (that is, node type, including host, rack, data center, and the representative of "Root" i.e. cluster) is determined; which is defined by the size of cluster, failure domain (such as support for failure of single/multiple hosts, racks, data centers, etc.), storage location preference (whether it is required to be stored nearby), and is determined based on actual conditions during deployment. In general, when adopting multiple repetitions for redundant policy, the node Root must store all N copies; if the number of nodes in below layers (i.e. child nodes of Root) is M, the maximum number of the copies each child node can store is $\lfloor N/M \rfloor$ (an integer not less than N/M).

3). Storage rules are established. Key-Value Map, a storage rule which is a mapping table between node type and maximum number of stored copies, is defined in this embodiment, wherein Key denotes the node type, and Value denotes the maximum number of copies allowed for the object. The definition of failure domain specifically refers to supporting the failure of single/multiple host, rack and/or data center. Data redundant policy specifically refers to multiple repetitions, erasure coding and/or regenerate coding. An object, referred to as a certain length of data segment, is a basic unit of data copy or encoding and stored in a hash subspace which is a node selection subject. The specific steps of establishing storage rules are as follows. First, determine the total number N of copies of pre-stored data. Data security can be improved by increasing data redundancy in distributed storage system. Conventional data redundancy methods include multiple repetitions, erasure coding/regenerate coding, etc. In multiple-repetitions manner, N copies of the object are stored at different positions in the cluster. In erasure coding manner, the object is divided into K data blocks, formed N coded blocks after the K blocks are encoded, and then N coded blocks are stored in different positions in the cluster. This embodiment takes 3-repetitions for an example, that is, N=3. Secondly, determine the maximum number of copies allowed for each storage layer (including device, server, rack and root in the embodiment). The maximum number of replicas in each layer is determined by factors such as the size of cluster(s), the division of failure domains and their number, whether a storage location preference is set, and so on. A general situation of 3-repetitions policy considered in this embodiment specifies that the number of copies stored in one rack is not greater than two, and the number of copies stored in each server or device is one at most. The following table shows monitoring rules for node selection.

| Storage Layer | Node Type | Type Value | Allowed Maximum Number of Copies | Notes |
|---|---|---|---|---|
| Root | NODE_TYPE_ROOT | 3 | 3 | Total Copies N |
| Rack | NODE_TYPE_RACK | 2 | 2 | |
| Server | NODE_TYPE_SERVER | 1 | 1 | |
| Device | NODE_TYPE_DEVICE | 0 | 1 | |

Finally, a mapping table between the node types and the maximum number of storage copies is established, with settings of:

RootTypeTimes=3,
RackTypeTimes=2,
ServerTypeTimes=DeviceTypeTimes=1.

Because Root is the representative of the whole cluster, the number of stored copies is N=3.

Step 3: A hash ring parameter is defined, and a random selection algorithm with monitored weight is used to select a target storage node sequence from the cluster for the pre-stored data according to the storage rules.

After establishing a constructed cluster hierarchy and storage rules, the random selection algorithm with monitored weight can be executed. First, an initial selection point is determined. From the initial selection point, suitable node for each storage layer based on the weight of the node is randomly selected according to the restriction of storage rules, until it comes to the leaf node of the hierarchical architecture of cluster(s), and then a suitable device node is selected from the leaf node. The parameters of the hash ring may include the length of the hash space, the length(s) of the hash subspace(s), the number of the hash subspace(s) and the adopted hash function "Hash". The hash subspace(s) having length(s) corresponding to the range of hash value with the same length(s), are adjacent and disjoint, together forming the entire hash space. The pre-stored data carries a unique identity. The hash value of the identity is computed and mapped to a unique hash subspace. Its execution may involve the following steps.

1). The parameters of the hash ring is defined, including the length L of the hash space (i.e. the length of the hash value, such as 32 bits), the length SL of the hash subspace, the adopted hash function, etc., wherein the number of the hash space SN=2^(L−SL) can be obtained based on L and SL.

2). The hash subspace to which the object belongs is addressed according to the object identity ObjectId, which is the hash value of the object identity by modulo the total number of hash subspace, that is Subspace=Hash(ObjectId) % SN.

3). The starting point is selected. It can be started from any storage layer. For an initial selection, it generally start from the node Root, and chooses N storage devices for Subspace, because Subspace is the basic unit of data redundancy and multiple objects can be mapped into the same Subspace.

4). Traverse from the selection point till the leaf node in the bottom-most layer of the tree architecture of cluster(s) is performed; during the traverse, the suitable child nodes for each storage layer is randomly selected according to the restrictions of the storage rules and according to the weight value of the child nodes, and finally a suitable device node is selected from the leaf node. The innovation of the present disclosure is that, when performing selection in each layer, whether the child node has reached the restriction of storage rules is firstly determined, that is whether the number of times being selected exceeds a maximum allowed number, if it reaches the restriction, the child node is excluded; if all child nodes have reached the storage restriction, the entire corresponding layer (i.e. the parent node) is excluded; and when a suitable node is selected in the device nodes in the bottom-most layer, the number of times being selected is first updated (plus 1), and then the numbers of times being selected of all the nodes on the path from its parent nodes to the Root node are updated (once a child node is selected, it means that all its ancestor nodes are also selected). It can be simply understood that the initial selection point is the entry point of the selection algorithm, and from the root node or from a node in any storage layer, the node specified in every storage layer is assigned with a maximum number that the node is allowed to be selected. The initial selection point is selected from the point in the top layer to the one in below layer with layer by layer; the point selected at each layer is used as a new entry point; such node selection process is repeated in the hierarchy until it comes to the leaf node. If a suitable device is selected, the numbers of times that this device and all its parent nodes are selected are updated. Determine whether the child node has reached the restriction of storage rules, if it has reached the restriction, the child node is excluded; and if all child nodes in corresponding layer have reached the restriction, their parent nodes are excluded. During the process of selecting a node in the child node list, the selection is performed based on the weight of corresponding child node. According to the storage rules, the nodes that do not meet the rules are excluded firstly, wherein the nodes that do not meet the rules may specifically refer to the nodes that have reach the restriction of storage.

5). When the number of selected devices is equal to a specified value (such as N) or the number of selection attempted is greater than a set threshold, the retrieve is stopped; If there are not enough devices that meet the storage rules (for example, the number of the devices in the cluster are too less, or the distribution of cluster storage is unevenly), in this case, the device nodes with the wanting number can be selected from the devices of cluster(s), and they can be chosen from the devices that have not been selected.

The following examples illustrate the random selection algorithm with monitored node weight. By means of the algorithm, a target storage node (device) sequence can be selected for pre-stored data from the cluster(s).

First, parameter(s) of the hash ring is defined. The length of the hash space in the embodiment is defined as L=32 bits, that is, the hash space is [0, 232-1], the length of each hash subspace is SL=20 bits, the number of the hash subspace(s) is SN=2(32-20)=212, the adopted hash function is Murmur3 and its output hash value is a 32-bit integer. Then the hash value of the object is computed and the hash subspace is located:

ObjectHash=Murmur3(ObjectId),

The hash value of the object ID is computed using a hash function;

HashSubspaceValue=ObjectHash % SN,

The hash subspace(s) is located, and the same hash subspace is corresponded to the same target device list.

Figure 3:
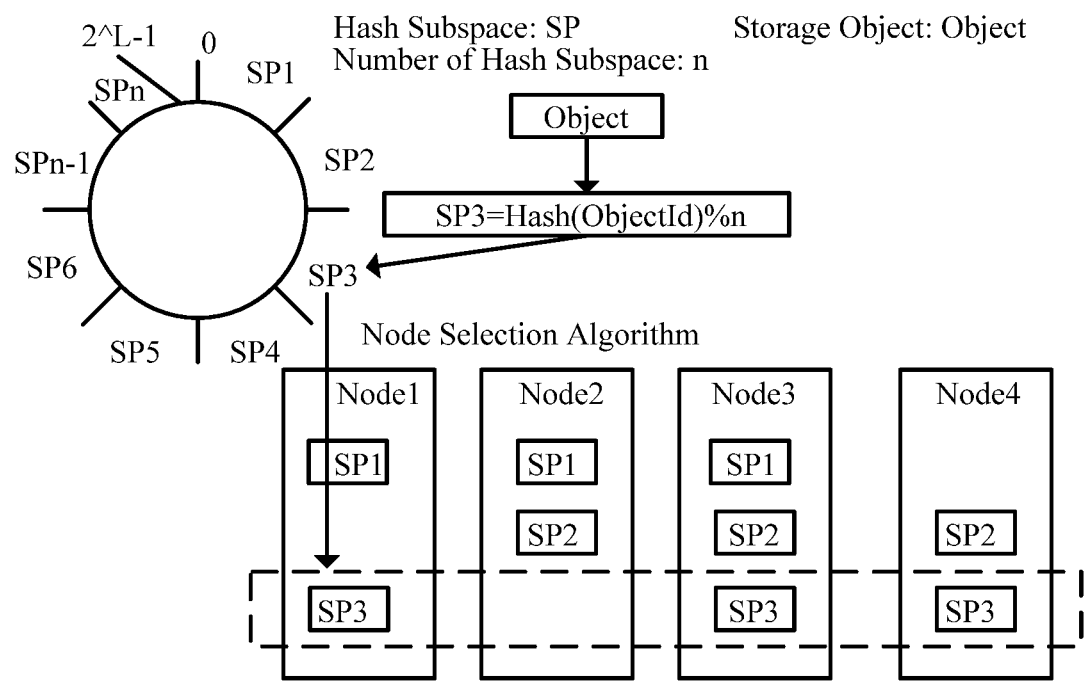
FIG. 3 is a schematic diagram of the division of hash ring and object routing process.

In FIG. 3, there is schematically shown the division of hash ring and object routing process. It illustrates the process of dividing hash ring and routing hash subspace node sequence, wherein each object corresponds to a hash subspace which is mapped to multiple device nodes, and each storage device is allocated a plurality of hash subspaces.

Then, the initial selection point is determined from any point in the cluster and a specified number of devices that meet the storage rules are selected in the sequence of child nodes in its below layer. In this embodiment, it is assumed that the three device nodes are selected for the object (i.e. the corresponding hash subspace HashSubspaceValue) from the node Root.

Figure 4:
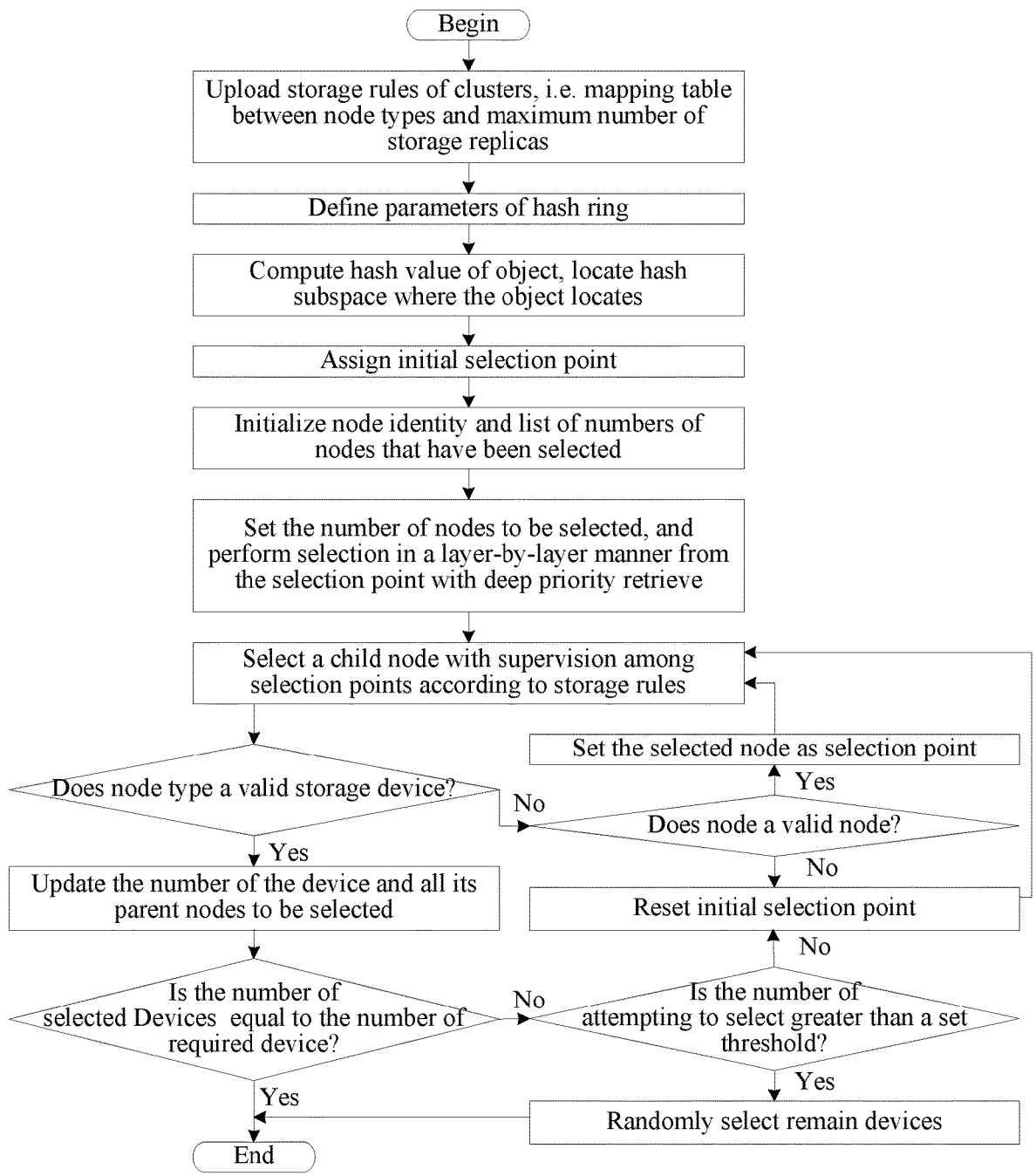
FIG. 4 is an overall flowchart for node selection.

Finally, suitable nodes are randomly selected for each storage layer according to the restriction of the storage rules and according to the node weight value from the selection point to the leaf node in the bottom-most layer in the cluster architecture tree, and suitable node(s) (i.e. storage device) is chosen from the leaf node. FIG. 4 illustrates an overall flowchart for node selection, including the following specific implementation steps:

The storage rules, that is, a mapping table between the node types and the maximum number of times that nodes are selected (i.e. the maximum number of storage copies in this example), are obtained.

The node identity NodeId and the mapping table SelectedNodeTimesMap of the number of times that nodes are selected are initialized. A new selection is started from the Root node in this example, then SelectedNodeTimesMap is empty, that is there are no selected nodes.

The number ReplicasNumber of nodes to be selected from the selection point is set:

In this example, it starts from Root, then ReplicasNumber=N=3.

Each time a node in lower layer is selected in a manner of depth first search from the root node, this node is used as the selection point. Such selection process is repeated until a suitable device node Device is selected, and then returns the initial selection point. A node is selected with supervision according to the storage rules, and its node type is checked whether it is a device and the node identity is valid, if so, whether the number of times it has been selected exceeds the maximum number allowed to be selected TypeMaxSelectionNumber is checked. If it exceeds, the selection is in conflict and an invalid node identity NODE_ITEM_INVALID is returned; and if not, the number of times that this node identity is selected in SelectedNodeTimesMap is updated, and the node identity NodeId of the device is returned. If the selected node type is non-device, the corresponding node is chosen as the selection point, and node selection in the next layer is repeated. Each time the node selection is returned, if the selected node identity is not equal to NODE_ITEM_INVALID (invalid node), the number of times that the node is selected in SelectedNodeTimesMap is updated.

Further, each time a device node is successfully selected, the number of times that the device node and all its ancestor nodes are selected is updated, that is, the supervision rules are updated.

When the number of selected device nodes is equal to ReplicasNumber, or the number of times that the node is attempted to be selected is greater that a certain threshold (for example, the threshold is set to 2 times the number of cluster when the cluster size is small, and actually it may only be slightly larger than ReplicasNumber), the retrieve is stopped; and when there are not enough devices that meet the storage rules (assuming that ReplicasNumberSelected is selected), device nodes can be selected randomly (ReplicasNumber-ReplicasNumberSelected) from the unselected devices in the cluster.

Figure 5:
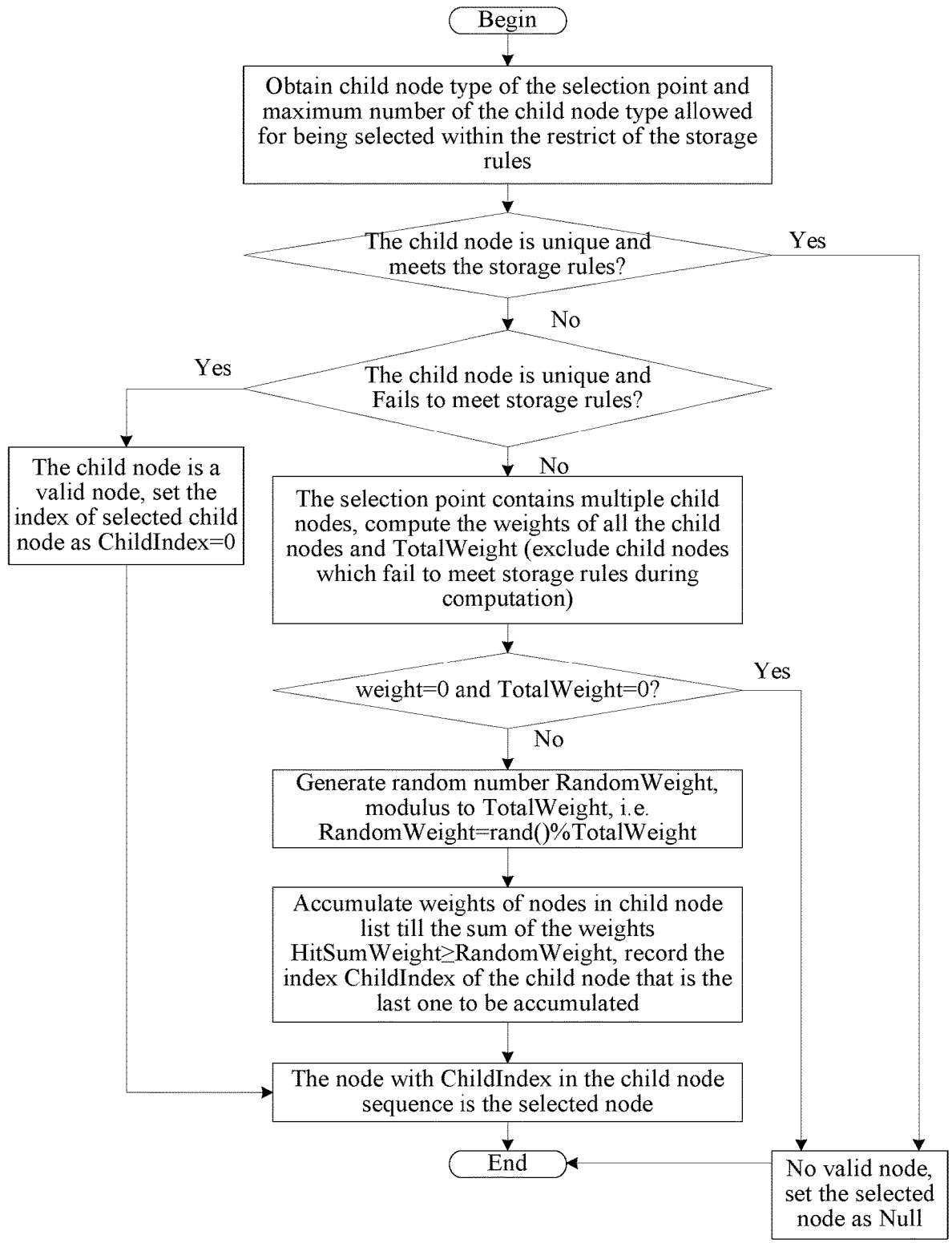
FIG. 5 is a flowchart of randomly selecting nodes with monitored weights.

FIG. 5 shows the node selection at each layer. It is a flowchart of randomly selecting nodes with monitored weights, and the specific execution thereof are as follows:

The node types of the child nodes ChildrenNodes of the selected point SelectingNode, as well as the maximum number of times that the child nodes allowed to be selected TypeMaxSelectionNumber defined by the storage rules, is obtained, which is the supervision rules of the node selection algorithm with monitoring according to the present disclosure. Each time the selection range is limited to the candidate child nodes that meet storage rules, the procedure that judging whether a node is a suitable node after random selection is avoided, thereby reducing the number of repeated selection and accelerating the convergence of selection.

When there is only one node in the child node list ChildrenNodes of SelectingNode, it is determined whether the number of times that the child node is selected exceeds the maximum number of times that the nodes with corresponding node type are selected TypeMaxSelectionNumber. If the number of times that the child node is selected does not exceed the maximum number of times that the nodes with corresponding node type are selected TypeMaxSelectionNumber, the child node is chosen only and the pointer of this child node is returned; otherwise, the number of SelectingNode that is selected is set and the selecting point is closed. When there is more than one node in the child node list ChildrenNodes of the SelectingNode, the process may be continued. For each node in the child node list ChildrenNodes, its weight and TotalWeight are computed; during which, the node(s) that has been selected more than the corresponding maximum number of its node type is excluded. If TotalWeight=0, there is no suitable node, and a null node pointer NULL is returned; otherwise, continue. A random number RandomWeight is generated, and is used with modulus to TotalWeight, i.e. RandomWeight=rand( ) % TotalWeight. The weights of nodes in ChildrenNodes are accumulated in turn until the sum of the weights HitSumWeight is greater than or equal to RandomWeight, i.e. HitSumWeight>=RandomWeight, and then the index ChildIndex of the child node that is currently accumulated is recorded. The return ChildrenNodes[ChildIndex] which is the selected node.

Based on the aforesaid embodiments, a method of distributed data redundancy storage using consistent hashing is disclosed herein. With the method, since the pointer of parent node is added to the nodes of the cluster, the efficiency of setting or modifying properties of nodes is enhanced, with the time complexity reducing from n log(n) to log(n). At the same time, with supervision rules joined in node selection, the nodes that fail to meet the conditions are excluded in advance, thereby avoiding or reducing the chance of conflict after random selection, decreasing the number of retry selection and speeding up node selection. In addition, when choosing the child nodes in each layer, a (single-time) random function oriented to each layer is used to replace the (multiple-time) hash value of all child nodes oriented to each layer, further increasing the efficiency of node selection. The method accelerates the time of adjusting properties of storage devices, and when the status of cluster node changes, such as offline due to a failure, node increase or removal, the response speed provided can be faster, reducing the time of system repair or load balance. Moreover, due to improvement of efficiency of node selection, the object addressing during data access is quicken, raising data access speed and storage system throughput.

The principle and implementation manners present disclosure have been described above with reference to the specific examples, which are merely provided for the purpose of understanding the present disclosure and are not intended to limit the present disclosure. It will be possible for those skilled in the art to make variations, simple deductions, deformations or replacements based on the principle of the present disclosure.

The invention claimed is:

1. A method of distributed data redundancy storage using consistent hashing, comprising:
a node creating step: establishing a logical topology between hash subspace(s) and each storage node in a distributed storage system, and determining a position of each node in a storage node sequence corresponding to each hash subspace by using consistent hashing; wherein establishing the logical topology comprises:
defining node properties which includes at least one of: node identity, node type, node weight, child node list and child node weight list; the node identity including at least one of: storage identity, host identity, rack identity and data center identity; the node type including at least one of: storage node, host node, rack node, data center node and root node,
constructing logical topology based on hierarchical architecture of cluster(s) of physical storage device(s) and defining node type according to a position of the physical storage device in the hierarchical architecture of cluster(s); the physical storage device including a memory, a host controlling the memory, a rack in which the host is placed, and a data center to which the rack subordinate,
defining the root node as a representative of the hierarchical architecture of cluster(s); and
defining the memory as a leaf node located at a bottommost layer of the hierarchical architecture of cluster(s);
a data writing step: determining a number of data copies and each piece of stored data according to a redundant storage policy of pre-stored data; and
storing each piece of stored data in a different storage node according to storage rules.

2. The method of claim 1, wherein the step of determining the number of data copies and each piece of stored data according to the redundant storage policy of pre-stored data comprises:
the number of data copies being a preset number of replicas and each piece of stored data being pre-stored data or a replica thereof when adopting multiple repetitions for the redundant storage policy; and
encoding pre-stored data into coded blocks when adopting erasure coding for the redundant storage policy, where the number of data copies are the total number of coded blocks and each piece of stored data corresponds to one coded block.

3. The method of claim 1, wherein parameters of the distributed storage system comprises length of hash space, length(s) of hash subspace(s), number of hash subspace(s), and an adopted hash function Hash;
the hash subspace(s) having length(s) corresponding to a range of hash value with same length(s) are adjacent and disjoint, together forming entire hash space; and the pre-stored data carries a unique identity, and a hash value of the identity is computed and mapped to a unique hash subspace.

4. The method of claim 1, wherein the node properties further comprise pointer(s) of parent node(s) along which the properties of a node and its parent node(s) can be modified layer by layer till the root node.

5. The method of claim 1, wherein storing each piece of pre-stored data to a different storage node based on storage rules comprises:
determining maximum number of data copies allowed for being stored in each storage hierarchy corresponding to the node type of each node; and
establishing a mapping table between node type(s) and maximum number of data copies; the mapping table including a correspondence between the maximum number of data copies and the maximum number of times that each node of corresponding node type is allowed to be selected.

6. The method of claim 5, further comprising:
determining an initial selection point which is a node; and
from the initial selection point, according to restriction of the storage rules and a weight of corresponding node, randomly selecting child nodes one by one in each storage layer below a layer where the initial selection point locates until it comes to leaf nodes of the hierarchical architecture of cluster(s), and selecting device node from the leaf nodes for storing each piece of stored data.

7. The method of claim 6, wherein
the initial selection point is selected from nodes in a top layer of the hierarchical architecture of cluster(s) to those in below layer in a layer-by-layer manner, and node(s) selected in each layer is served as new selection point(s); such process of node selection is repeated until it comes to leaf node(s);
device node(s) is selected among leaf node(s), and when device node(s) is selected, numbers of selected times of the device node(s) and the parent node(s) of the selected device node(s) are updated.

8. The method of claim 7, further comprising:
checking whether child node(s) of the selected node(s) in each layer has reached the restriction of the storage rules, if the child node(s) has reached the restriction, the child node(s) is excluded; and if all child nodes in corresponding layer have reached the restriction, the parent node(s) of the child nodes are excluded; and
performing selection based on weight of child node(s) during the process of selecting node(s) in a child node list of the node(s) selected in each layer.

9. The method of claim 8, further comprising:
excluding nodes which fail to meet requirements according to the storage rules, wherein the nodes which fail to meet requirements refer to the nodes that have reach the restriction of storage.

* * * * *